United States Patent
Davis et al.

(10) Patent No.: US 6,471,117 B1
(45) Date of Patent: Oct. 29, 2002

(54) TRANSFER FLUXING METHOD AND APPARATUS FOR COMPONENT PLACEMENT ON SUBSTRATE

(75) Inventors: John Gillette Davis; Allen Thomas Mays; Kris Allen Slesinger, all of Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,576

(22) Filed: Nov. 4, 1999

Related U.S. Application Data

(62) Division of application No. 09/005,539, filed on Jan. 12, 1998, now Pat. No. 6,039,805.

(51) Int. Cl.[7] .......................... B23K 1/20; B23K 31/02
(52) U.S. Cl. ...................... 228/223; 228/162; 427/310; 427/282; 427/126.1
(58) Field of Search ................................ 228/223, 102, 228/19, 35; 427/282, 310, 58, 126.1

(56) References Cited

U.S. PATENT DOCUMENTS

| | | | |
|---|---|---|---|
| 1,090,095 A | | 3/1914 | Blanford |
| 2,823,633 A | | 2/1958 | Meier |
| 3,876,314 A | | 4/1975 | Nehring |
| 4,151,945 A | | 5/1979 | Ragard |
| 4,752,027 A | * | 6/1988 | Gschwend ............... 228/180.2 |
| 4,790,259 A | | 12/1988 | Morris |
| 4,843,961 A | | 7/1989 | Smith |
| 5,074,455 A | | 12/1991 | Peana et al. |
| 5,126,648 A | * | 6/1992 | Jacobs |
| 5,145,531 A | * | 9/1992 | Turner et al. |
| 5,192,154 A | | 3/1993 | Moeck |
| 5,429,293 A | * | 7/1995 | Bradley, III et al. |
| 5,482,736 A | | 1/1996 | Glenn |
| 5,609,292 A | * | 3/1997 | Kohn |
| 5,676,305 A | * | 10/1997 | Potter et al. |
| 5,692,292 A | * | 12/1997 | Asai et al. |
| 5,747,102 A | * | 5/1998 | Smith et al. |
| 5,834,062 A | * | 11/1998 | Johnson et al. |
| 5,864,833 A | * | 1/1999 | Schaffer et al. |
| 5,872,051 A | * | 2/1999 | Fallon et al. |
| 5,909,504 A | * | 6/1999 | Whitman |
| 5,960,125 A | * | 9/1999 | Michael et al. |
| 5,978,080 A | * | 11/1999 | Michael et al. |
| 6,013,899 A | * | 1/2000 | Eguchi et al. ............... 219/388 |
| 6,043,877 A | * | 3/2000 | Land |
| 6,053,398 A | * | 4/2000 | Iizuka et al. |
| 6,075,881 A | * | 6/2000 | Foster et al. |
| 6,156,885 A | * | 12/2000 | Gaynes et al. |

* cited by examiner

Primary Examiner—Tom Dunn
Assistant Examiner—Colleen P. Cooke
(74) Attorney, Agent, or Firm—Scully, Scott, Murphy & Presser; Lawrence R. Fraley, Esq.

(57) ABSTRACT

A transfer fluxing apparatus is provided. The apparatus is a flux reservoir for holding flux, a compliant pad attached to an opening in the flux reservoir and a means for controlling deposition of flux onto the compliant pad. The apparatus can be attached to an automated component placement machine. In the preferred embodiment of the invention, the control means is a valve located within the flux reservoir. The valve is opened by applying pressure to a plunger that extends through the compliant pad. When the plunger is pressed, the valve opens, and flux falls onto the compliant pad. Flux then passes through the pad to a component placement site. A method for automated fluxing and to component placement also is provided.

13 Claims, 3 Drawing Sheets

TRANSFER FLUXING METHOD AND APPARATUS FOR COMPONENT PLACEMENT ON SUBSTRATE

CROSS-REFERENCE TO RELATED PATENT APPLICATION

This application is a divisional application of Serial No. 09/005,539; filed on Jan. 12, 1998 now U.S. Pat. No. 6,039,805.

FIELD OF THE INVENTION

The invention relates to the automated application of flux to component placement sites on a substrate such as a printed circuit board.

BACKGROUND OF THE INVENTION

In the manufacture of laminated substrates, such as printed circuit boards, flux is used to hold surface-mounted components in place until the components can be soldered permanently to the substrate. Flux acts as an adhesive to hold the components in place pending soldering. Flux also minimizes metallic oxidation which can occur at soldering temperatures. The result is improved reliability of the electrical connection.

Flux is a suspension liquid typically comprised of various low-solids acid suspended in an alcohol base. Flux is applied to the areas on the substrate where a component will be soldered (the "component placement sites"). Controlling the volume of flux applied to the component placement sites is important, since enough flux must be used to cover a given site; but too much flux is undesirable, since it impacts other circuit board manufacturing processes. For example, flux is used particularly to hold C4 chips in place during the soldering of the chips to the substrate. If too much flux is used with C4 chips, the flux residue adversely impacts chip underfill reliability.

Placement of the components onto the substrate must be performed while the flux is wet, or the flux will not be tacky enough to hold the components in location prior to soldering. However, the no-clean flux developed for this application dries very quickly (in seconds). Therefore, fluxing must be performed immediately before placement of the components. As a result, the fluxing process must be a part of the automated placement of the components.

Flux has been applied in the past using a variety of manual and automated methods. Popular methods include dipping, brushing, syringe dispensing, spraying, or atomizing flux onto the component and/or substrate prior to placement of the component on the substrate. Transfer methods of applying flux also may be used. A transfer method involves dipping a compliant tip into a flux bath, moving the tip over to a component placement site, and pressing the tip onto the site to deposit flux at the site.

SUMMARY OF THE INVENTION

An object of the invention is to provide an automated method for applying flux to component placement sites.

A further object of the invention is to provide an apparatus for automatic application of flux to component placement sites.

Accordingly, a transfer fluxing apparatus is provided. The apparatus is a flux reservoir for holding flux, a compliant pad attached to an opening in the flux reservoir and a means for controlling deposition of flux onto the compliant pad. The apparatus can be attached to an automated component placement machine. In the preferred embodiment of the invention, the control means is a valve located within the flux reservoir. The valve is opened by applying pressure to a plunger that extends through the compliant pad. When the plunger is pressed, the valve opens, and flux falls onto the compliant pad. Flux then passes through the pad to a component placement site. A method for applying transfer flux to component placement sites also is provided.

The invention thus provides a method and apparatus for automatically applying flux to component placement sites. The flux is applied only to the substrate, is applied in carefully controlled, minimal amounts and is applied just prior to component placement.

DETAILED DESCRIPTION OF A PREFERRED EMBODIMENT OF THE INVENTION

The apparatus of the present invention dispenses soldering flux to component placement sites using a compliant pad. The apparatus is designed to mount to a robotic arm on a typical automated component placement machine. Typical automated component placement machines have multiple pick/place heads. For example, on a twin-headed placement machine, one head could carry the fluxing apparatus of the present invention while the other head performs component pick and place operations. In such an arrangement, the flux is deposited just prior to the component being placed on the substrate.

Figure 1:
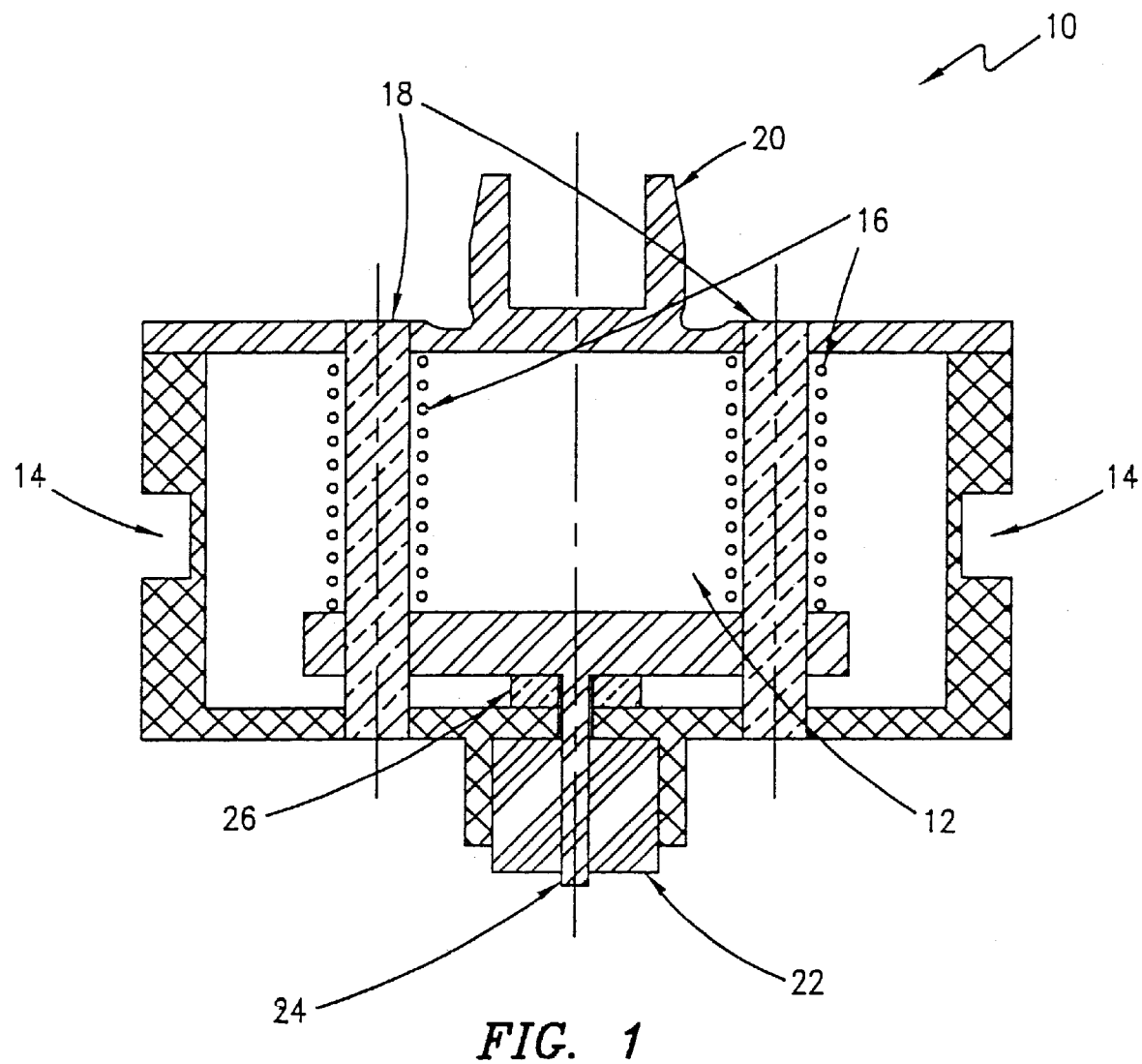
FIG. 1 shows a cross-sectional view of the transfer flux apparatus of the present invention.

The apparatus of the present invention is best understood by reference to the drawings. FIG. 1 shows a cross-sectional view of the transfer fluxing apparatus 10 of the present invention. FIG. 1 shows a flux reservoir 12 for holding flux (flux not shown). Flux reservoir 12 is large enough to hold sufficient flux to process large numbers of component placement sites between refills of the flux reservoir 12. In the preferred embodiment of the invention, the flux reservoir 12 is made of aluminum. Aluminum is strong, light, and corrosion resistant. Indentations in the sides of flux reservoir 12 are alignment slots 14. The alignment slots 14 or other alignment means are useful in correctly attaching the flux reservoir 12 to a docking station 36 (shown in FIGS. 2 and 3).

Flux reservoir 12 has a means for attaching the flux reservoir 12 to an automated component placement machine (machine not shown). In FIG. 1, the attachment means shown is an end-of-arm interface 20 at the top of the flux reservoir 12. In the preferred embodiment of the invention, end-of-arm interface 20 is made of steel, because the robot manipulator used in the manufacturing process uses magnets to acquire various tips. Other materials may be used for the end-of-arm interface, particularly if the robot manipulator or other tool involved uses an engagement means other than magnets.

At the bottom of flux reservoir 12 is a compliant pad 22 and a plunger 24. Compliant pad 22 distributes the solder flux onto the component placement site on the substrate (not shown). In the preferred embodiment of the invention, compliant pad 22 is made of foam rubber. The plunger 24 engages the component placement site on the substrate and prevents slippage of the substrate with respect to the compliant pad 22. In the preferred embodiment of the invention, plunger 24 is made of stainless steel.

The advantages of the compliant pad 22 as the flux application means are numerous. The pad 22 provides direct contact with the component placement site. There is no drag across the surface of the substrate. As a result, damage to the surface of the substrate is minimized. Guide pins 18 keep the plunger 24 from cocking or binding. In the preferred embodiment of the invention, guide pins 18 are made of stainless steel. The compliant pad 22 also assures precise deposition of the flux. The pad 22, for example, can be shaped precisely to the shape of the site of the component involved. For example, the pad can conform to the site of a C4 chip. Although shown as a rectangular shape, the pad 22 can take any shape, including that of an application tip. Moreover, using the pad 22 ensures substantially uniform and substantially simultaneous deposition of the flux on the component placement site. This assures the flux will not dry prior to attachment of the component.

Finally, the compliant pad 22 allows volume control of the amount of flux being deposited. Volume control is achieved by controlling the porosity of the material comprising the pad and by controlling the viscosity of the flux used. Volume control also can be achieved mechanically by connecting the plunger 24 to a valve 26, such as a gasket. In the preferred embodiment of the invention shown in FIG. 1, touching the component placement site with the plunger 24 causes valve 26 to open and thereby allows flux to fall onto the compliant pad 22. The volume of flux deposited onto the compliant pad 22 is proportional to the size of the valve opening, the size of the compliant pad 22, the viscosity of the flux, and the length of time the plunger 24 is in contact with the component placement site. All variables are held constant except contact time, which is a user-defined parameter when this apparatus is part of an automated workcell.

Springs 16, shown in FIG. 1, keep the valve from leaking when not in contact with a substrate. That is, the springs 16 seal the plunger 24 against the valve 26. In the preferred embodiment of the invention, valve 26 is made of neoprene rubber, which has good flexibility.

Figure 2:
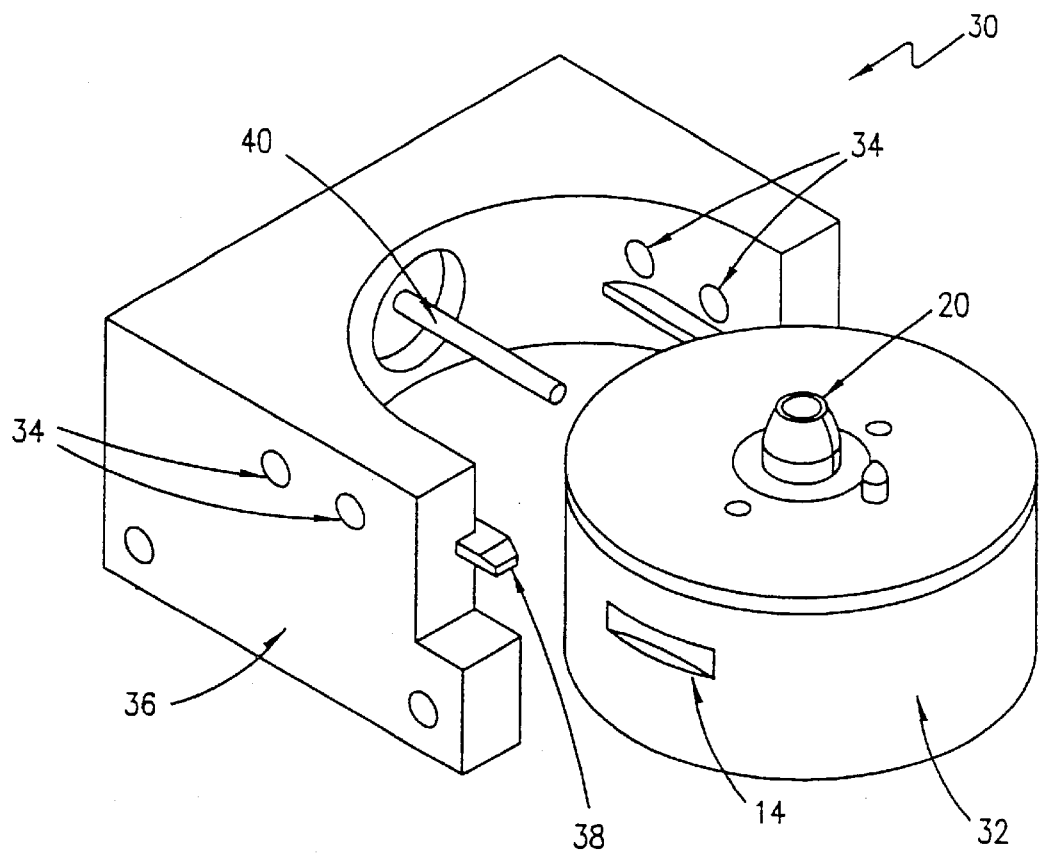
FIG. 2 shows an oblique view of the transfer flux application apparatus of the present invention that includes automated refill of flux.
Figure 3:
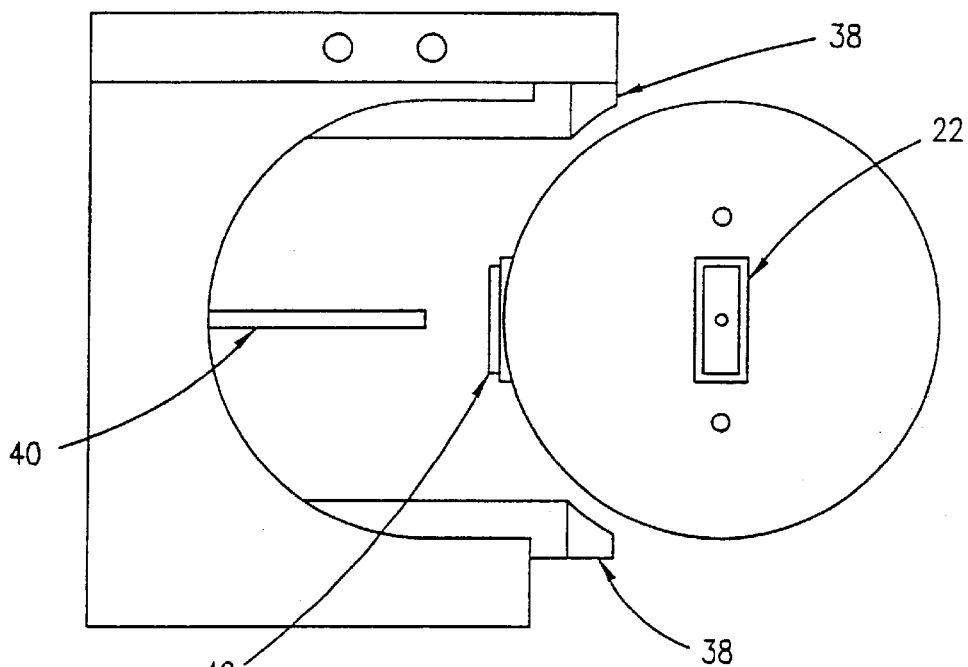
FIG. 3 shows a bottom view of the apparatus shown in FIG. 2.

Shown in FIGS. 2 and 3 is an alternative embodiment of the present invention. FIGS. 2 and 3 show a transfer flux application apparatus that includes automated refill of flux. FIG. 2 is an oblique view of the apparatus 30. As shown in FIG. 1, flux reservoir 32 has alignment slots 14 for guiding the placement of the flux reservoir 32 into a docking station 36. Flux reservoir 32 is the same as flux reservoir 12 shown in FIG. 1, except that flux reservoir 32 has refill valve 42 (shown in FIG. 3) and flux reservoir 12 does not. At the top of flux reservoir 32 is end-of-arm interface means 20 for connecting the flux reservoir to an automated component placement machine (machine not shown). FIG. 2 also shows docking station 36. Docking station 36 is not shown in Figure. 1. Docking station 36 surrounds flux reservoir 32. At the back of docking station 36 is refill syringe 40 through which flux is added to flux reservoir 32.

FIG. 2 also shows, as part of docking station 36, alignment arms 38 on either side of the docking station 36. Alignment arms 38 engage alignment slots 14 in the side of flux reservoir 32. Ball end plungers 34 also are shown on docking station 36. Ball end plungers 34 are further means for holding in place flux reservoir 32.

FIG. 3 is a bottom view of the apparatus shown in FIG. 2. FIG. 3 shows that refill syringe 40 inserts into refill valve 42 in the rear of the flux reservoir 32. Flux can be added by means of refill syringe 40 to the flux reservoir 32 as directed by a user. One possibility is to add flux at set time intervals or quantity of dispense cycles determined by a user.

Figure 4:
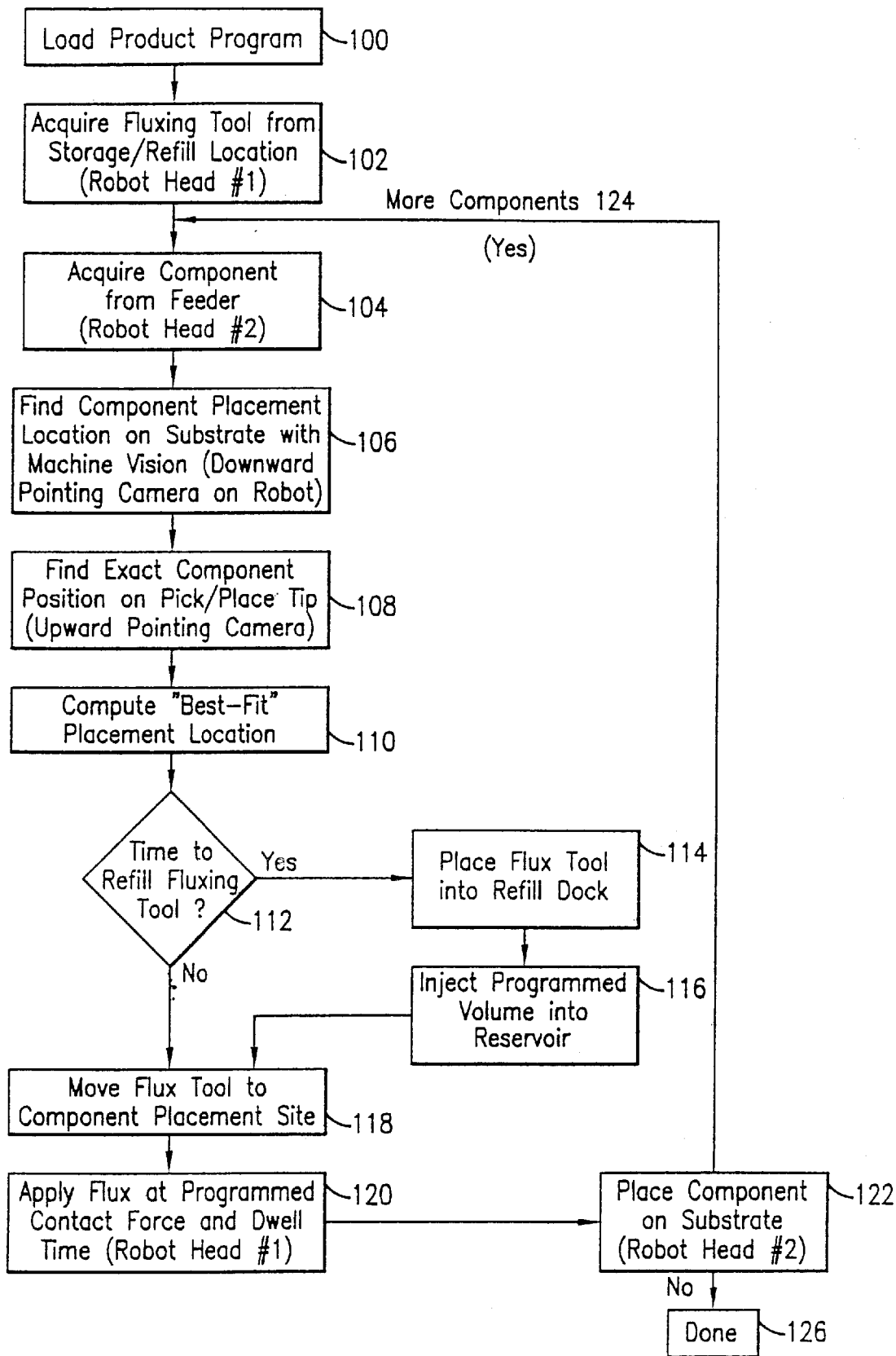
FIG. 4 is a flowchart of the transfer fluxing method of the present invention.

FIG. 4 is a flowchart of the method of the present invention. FIG. 4 shows the steps to achieve automatic fluxing in accordance with the present invention. The first step 100 in the automated fluxing and component placement method of the present invention is to load the appropriate product program that coordinates the process. The method of the present invention contemplates a twin-headed automated component placement machine. One head of the machine (robot head #1) carries the fluxing apparatus of the present invention. The other head of the machine (robot head #2) performs component pick-and-place operations. The program loaded in step 100 thus controls robot head #1, robot head #2 and, if using the apparatus shown in FIGS. 2 and 3, the automated refill of flux into the flux reservoir.

In step 102 in the method, robot head #1 acquires the fluxing apparatus, such as from a storage or refill location. End-of-arm interface 20 is used to attach the fluxing apparatus to robot head #1.

In step 104, robot head #2 then acquires the component to be placed on a substrate. The component typically is taken from a feeder.

In step 106, a target component placement location is identified on the substrate. A downward pointing camera or other machine vision means on the component placement machine is useful in locating the target component placement location.

In step 108, an exact component position on the pick/place tip of robot head #2 must be determined. An upward pointing camera or other machine vision means on the component placement machine is useful in precisely determining the component position on the pick/place tip.

Based on the information determined in steps 106 and 108, in step 110, the "best fit" placement location on the substrate is determined. This is the component placement site.

Steps 112, 114 and 116 describe the automated refilling process. These steps are performed if the apparatus shown in FIGS. 2 and 3 is used as the fluxing tool. Step 112 indicates a decision point as to whether it is time to refill the fluxing tool with flux. If so, then robot head #1, which is carrying the fluxing tool, places the fluxing tool into the refill docking station. The docking station is shown in FIGS. 2 and 3. Once the fluxing tool is in the docking station, in step 116, a programmed volume of flux is injected into the flux reservoir, and the fluxing tool is removed from the refill docking station. Steps 112, 114 and 116 may be performed at any point in the process shown in FIG. 4. Refilling of the flux reservoir may be programmed to occur at specified time intervals or after a specified number of fluxing cycles.

In step 118, robot head #1 moves the fluxing tool to the component placement site on the substrate. In step 120, the fluxing tool then applies flux to the component placement site. The amount of flux applied is controlled by programming the contact force and the dwell time between the fluxing tool and the component placement site on the substrate.

In step 122, robot head. #2 places the component on the component placement site on the substrate. Using the automated process of the present invention, the component placement occurs before the flux dries.

As shown by line 124, if additional components need to be placed, then the process returns to step 104 and repeats steps 104–122. If there are no further components to be placed, then the process is done (step 126).

Although the invention has been described with some particularity, those skilled in the art will realize that certain modifications are possible and are still within the scope of the invention. The invention is limited only by the following claims and their equivalents.

What is claimed is:

1. A method for transfer fluxing, comprising the following steps in the following order:

loading a product program;

acquiring a fluxing tool comprising a flux reservoir on a first robot head of an automated component placement machine;

attaching a compliant pad to an opening in the flux reservoir;

controlling the deposition of flux onto the complaint pad;

acquiring a component on a second robot head of the automated component placement machine;

identifying a target placement location for the component on a substrate;

identifying a position of the component on the second robot head;

determining a component placement site for the component on the substrate based on the identifying of the target placement location on the substrate and on the identifying of the position of the component on the second robot head;

moving the first robot head carrying the fluxing tool to the component placement site;

applying flux to the component placement site with the fluxing tool;

placing the component on the substrate using the second robot head; and determining if additional components need to be placed and, if so, repeating the steps from acquiring the component; and if not, ending the process.

2. The method of claim 1, further comprising, after any step in the method following the step of acquiring the fluxing tool, the following additional steps:

determining if the fluxing tool needs refilling;

when the fluxing tool does need refilling, then placing the fluxing tool into a refill dock and refilling the flux reservoir; and when the fluxing tool does not need refilling, continuing to the next step of the method.

3. The method of claim 1, wherein the step of applying flux further comprises:

defining a contact force and a dwell time between the fluxing tool and the component placement site to control flux flow.

4. The method of claim 1, further comprising attaching the fluxing tool to said automated component placement machine.

5. The method of claim 1, further comprising attaching the flux tool to a robotic arm of said automated component placement machine.

6. The method of claim 5, wherein the attachment of said fluxing tool is effected at an end-of-arm interface.

7. The method of claim 1, further comprising:

providing a docking station; and effecting the steps of holding the flux reservoir in the docking station.

8. The method of claim 7, wherein the flux reservoir is held by springs in the docking system.

9. The method of claim 8, further comprising:

correctly positioning the flux reservoir in the docking station through the interposition of guide pins.

10. The method of claim 1, wherein controlling the deposition of flux onto the compliant pad comprises the steps of:

causing a valve upon being closed preventing flux from being deposited onto the compliant pad; and upon opening of the valve permitting flux to fall onto compliant pad.

11. The method of claim 10, wherein the step of opening said valve is implemented by a plunger extending from the compliant pad to the valve.

12. The method of claim 1, wherein flux refilling is implemented by a refill syringe extending through a wall of the flux reservoir.

13. The method of claim 12, wherein the further step of flux refilling refills the flux reservoir at specified time intervals or number of fluxing cycles.

* * * * *